(12) United States Patent
Kim et al.

(10) Patent No.: US 12,487,176 B2
(45) Date of Patent: Dec. 2, 2025

(54) ACCURATE TURBIDITY MEASUREMENT SYSTEM AND METHOD, USING SPECKLE PATTERN

(71) Applicant: THE WAVE TALK, INC., Daejeon (KR)

(72) Inventors: Young Dug Kim, Seongnam-si (KR); Kyoung Man Cho, Seoul (KR)

(73) Assignee: THE WAVE TALK, INC., Daejeon (KR)

( * ) Notice: Subject to any disclaimer, the term of this patent is extended or adjusted under 35 U.S.C. 154(b) by 73 days.

(21) Appl. No.: 18/278,977

(22) PCT Filed: May 30, 2022

(86) PCT No.: PCT/KR2022/007636
§ 371 (c)(1),
(2) Date: Aug. 25, 2023

(87) PCT Pub. No.: WO2022/260327
PCT Pub. Date: Dec. 15, 2022

(65) Prior Publication Data
US 2024/0133808 A1 Apr. 25, 2024
US 2024/0230531 A9 Jul. 11, 2024

(30) Foreign Application Priority Data

Jun. 8, 2021 (KR) .......................... 10-2021-0074059

(51) Int. Cl.
*G01N 21/53* (2006.01)
*G01N 15/075* (2024.01)
(Continued)

(52) U.S. Cl.
CPC ........... *G01N 21/53* (2013.01); *G01N 15/075* (2024.01); *D06F 34/22* (2020.02);
(Continued)

(58) Field of Classification Search
CPC ..... D06F 2103/20; D06F 34/22; G01N 15/06; G01N 15/075; G01N 2015/0053;
(Continued)

(56) References Cited

U.S. PATENT DOCUMENTS 5,956,139 A 9/1999 Meyer et al.
8,218,144 B2 7/2012 Jiang et al.
(Continued)

FOREIGN PATENT DOCUMENTS

EP 0899548 B1 12/2004
KR 10-0903133 B1 6/2009
(Continued)

*Primary Examiner* — Tri T Ton
(74) *Attorney, Agent, or Firm* — Bridgeway IP Law Group, PLLC; Sang Ho Lee; Hyun Woo Shin (57) ABSTRACT

Provided is an accurate turbidity measurement system and method, using a speckle pattern, in which a speckle pattern may be used for turbidity measurement, thereby enabling turbidity and bacterial or microbial contamination to be measured with high accuracy. The system may include: a measuring container which has a light input part formed in one side thereof, has a light scattering space formed therein, and has a light output part formed in the other side thereof; and an optical dilution member which is formed in at least a portion of the light scattering space, has a sample receiving part formed in one side thereof, and comprises an optical dilution medium having a role of optically diluting a speckle pattern of the sample.

8 Claims, 6 Drawing Sheets

(51) Int. Cl.
  *D06F 34/22*   (2020.01)
  *D06F 103/20*  (2020.01)
  *G01N 15/00*   (2006.01)
  *G01N 15/01*   (2024.01)
  *G01N 21/47*   (2006.01)
  *G01N 21/85*   (2006.01)

(52) U.S. Cl.
  CPC .. *D06F 2103/20* (2020.02); *G01N 2015/0053* (2013.01); *G01N 2015/019* (2024.01); *G01N 2021/479* (2013.01); *G01N 21/85* (2013.01); *G01N 2201/06113* (2013.01); *G01N 2201/0668* (2013.01)

(58) Field of Classification Search
  CPC ....... G01N 2015/019; G01N 2021/479; G01N 21/49; G01N 21/53; G01N 21/85; G01N 2201/06113; G01N 2201/0668
  See application file for complete search history.

(56) References Cited

U.S. PATENT DOCUMENTS

| | | | |
|---|---|---|---|
| 8,345,248 B2 | 1/2013 | Hong et al. | |
| 10,001,467 B2 | 6/2018 | Park et al. | |
| 10,585,039 B1 | 3/2020 | Park et al. | |
| 11,156,541 B2 | 10/2021 | Kim et al. | |
| 2012/0252127 A1* | 10/2012 | Gregor | G01N 21/82 436/69 |
| 2019/0293620 A1* | 9/2019 | Farkas | G01N 21/3563 |
| 2021/0025803 A1 | 1/2021 | Kim et al. | |
| 2022/0080114 A1 | 3/2022 | Kim | |

FOREIGN PATENT DOCUMENTS

| | | | | |
|---|---|---|---|---|
| KR | 10-2010-0093256 A | 8/2010 | | |
| KR | 10-1170859 B1 | 8/2012 | | |
| KR | 10-1686766 B1 | 12/2016 | | |
| KR | 10-2018-0053984 A | 5/2018 | | |
| KR | 10-2020-0004128 A | 1/2020 | | |
| KR | 10-2020-0028748 A | 3/2020 | | |
| KR | 10-2130100 B1 | 7/2020 | | |
| WO | WO-2019221557 A1 * | 11/2019 | | A61L 2/28 |
| WO | 2020/153649 A1 | 7/2020 | | |

* cited by examiner

ACCURATE TURBIDITY MEASUREMENT SYSTEM AND METHOD, USING SPECKLE PATTERN

TECHNICAL FIELD

The present invention relates to an accurate turbidity measurement system and method using a speckle pattern, and more particularly, to an accurate turbidity measurement system and method using a speckle pattern, in which a speckle pattern may be used for turbidity measurement, thereby enabling turbidity and bacterial or microbial contamination to be measured with high accuracy.

BACKGROUND ART

In general, a conventional turbidity sensor applied to a washing machine or the like uses a phenomenon of light occlusion by foreign matter contained in wash water in a washing tub, and a simple optical sensor is used in which light emitted from a light-emitting sensor and passing through the wash water is received by a light receiving sensor and a luminance signal of the received light, i.e., the intensity of light, is measured and converted into a turbidity value.

However, the turbidity measurement method using such an optical sensor is unable to measure the precise intensity of light, that is, micro-light intensity, due to the irregular variations in brightness caused by the positions and irregular travel paths of foreign matter. Consequently, it is challenging to accurately determine whether washed clothes have been sufficiently cleaned, leading to the issue of unnecessary use of more wash water than required.

In addition, the turbidity measurement method using the conventional optical sensor can only measure macro-turbidity, but has issues with not being able to detect biological contamination caused by bacteria or microorganisms present, for example, in the washed clothes.

Meanwhile, in recent years, a speckle detection method has been developed and used to detect contamination caused by bacteria or microorganisms cultured in a medium in a non-contact manner, wherein by using laser light generated from a laser source, a speckle pattern of the culture medium due to multiple scattering by bacteria or microorganisms is photographed by a camera.

However, the speckle detection method may measure biological contamination with high precision in relatively low-concentration samples, but cannot measure biological contamination in relatively high-concentration samples such as wash water because the range of measurement is exceeded.

DETAILED DESCRIPTION OF THE INVENTION

Technical Problem

An object of the present invention is to provide an accurate turbidity measurement system and method which enables precise calculation of micro-turbidity of a sample, such as wash water of a washing machine, by using an optical dilution member capable of optically diluting a speckle concentration of the sample, thereby saving the wash water of the washing machine, or significantly improving the performance of the washing machine, and also enables measurement of biological contamination of the sample caused by bacteria or microorganisms, greatly enhancing the performance of washing machines and other electronic products that require turbidity measurement. However, the above object is illustrative only, and does not limit the scope of the present invention.

Technical Solution

According to an aspect of the present invention to achieve the above object, there is provided an accurate turbidity measurement system using a speckle pattern, the system including: a measuring container which has a light input part formed in one side thereof so as to enable laser light to be inputted, has a light scattering space formed therein so as to enable multiple reflection or multiple scattering of the laser light through multiple paths, and has a light output part formed in the other side thereof so as to enable measurement of micro-turbidity or bacterial or microbial contamination by using a speckle pattern generated in the light scattering space; and an optical dilution member which is formed in at least a portion of the light scattering space, has a sample receiving part formed in one side thereof so as to receive a sample being measured, and comprises an optical dilution medium having a role of optically diluting a speckle pattern of the sample so as to enable measurement of the micro-turbidity of the sample.

In addition, according to the present invention, the measuring container may have an overall cylindrical shape made of at least metal, glass, synthetic resin, and combinations thereof, in which scattering protrusions or scattering layers are formed on an inner surface.

In addition, according to the present invention, in the measuring container, a first height of the light input part and a second height of the light output part may differ from each other such that a main light-emitting axis of a laser source configured to generate the laser light is deviated from a main light-receiving axis of a first camera configured to measure the speckle pattern, or a first eccentric position of the light input part and a second eccentric position of the light output part may differ from each other.

In addition, according to the present invention, the optical dilution member may be a pure light-transmission body from which optical foreign matter or biological contamination is completely or almost eliminated, such that a speckle pattern is not produced therein.

In addition, according to the present invention, the optical dilution member may have an overall circular cylindrical shape in which at least a portion of the sample receiving part is installed at a center axis of the measuring container, such that the optical dilution member can be formed in a shape that sufficiently encompass the sample.

In addition, according to the present invention, the system may further include a laser source configured to emit the laser light to the light input part; and a first camera configured to photograph a speckle pattern of the light output part.

Also, according to the present invention, the system may further include a speckle pattern variation calculation part configured to measure a variation over time of the speckle pattern using video information received from the first camera.

In addition, according to the present invention, the measuring container may have an optical hole formed at a portion that corresponds to a main light-emitting axis line of the laser source passing through the sample, and the system may further include a second camera configured to photograph brightness of the optical hole and a macro-turbidity calculation part configured to calculate macro-turbidity using brightness information received from the second camera.

Moreover, according to the present invention, the speckle pattern variation calculation part may calculate a micro-turbidity value proportionally by multiplying an actually measured turbidity value obtained from an actually measured variation of the speckle pattern with a multiple of the area of the optical dilution member based on the area of the sample.

According to an aspect of the present invention to achieve the above object, there is provided an accurate turbidity measurement method using a speckle pattern, the method including: (a) emitting laser light into a measuring container through a light input part; (b) enabling multiple reflection or multiple scattering of the laser light through multiple paths using a light scattering space of the measuring container such that a part of the laser light passes through the sample and exhibits a speckle pattern and another part of the laser light passes through an optical dilution medium that optically dilutes the speckle pattern of the sample; and (c) measuring micro-turbidity or bacterial or microbial contamination of the sample by measuring the optically diluted speckle pattern of the sample through the light output part of the measuring container.

Also, according to the present invention, in operation (c), a micro-turbidity value may be calculated proportionally by multiplying an actually measured turbidity value obtained from an actually measured variation of the speckle pattern with a multiple of the area of the optical dilution member based on the area of the sample.

In addition, according to the present invention, the method may further include, after operation (b), (d) calculating macro-turbidity by measuring brightness of the laser light that has passed through the sample through an optical path of the measuring container.

Effect of the Invention

According to an embodiment of the present invention as described above, by using an optical dilution member capable of optically diluting the speckle concentration of a sample, it is possible to precisely calculate micro-turbidity of a sample, such as wash water of a washing machine, thereby saving wash water of the washing machine or significantly improving the performance of the washing machine. In addition, it is possible to measure biological contamination of the same caused by bacteria or microorganisms, thus greatly enhancing the performance, precision, and reliability of washing machines and other electronic products that require turbidity measurement. However, the above effects do not limit the scope of the present invention.

MODE FOR INVENTION

The present invention will now be described in detail in connection with preferred embodiments with reference to the accompanying drawings. The present invention may, however, be embodied in many different forms and should not be construed as limited to the exemplary embodiments set forth herein. Rather, these embodiments are provided so that this disclosure will be thorough and complete, and will fully convey the scope of the inventive concept to one of ordinary skill in the art. Sizes of components in the drawings may be exaggerated for convenience of explanation.

Figure 1:
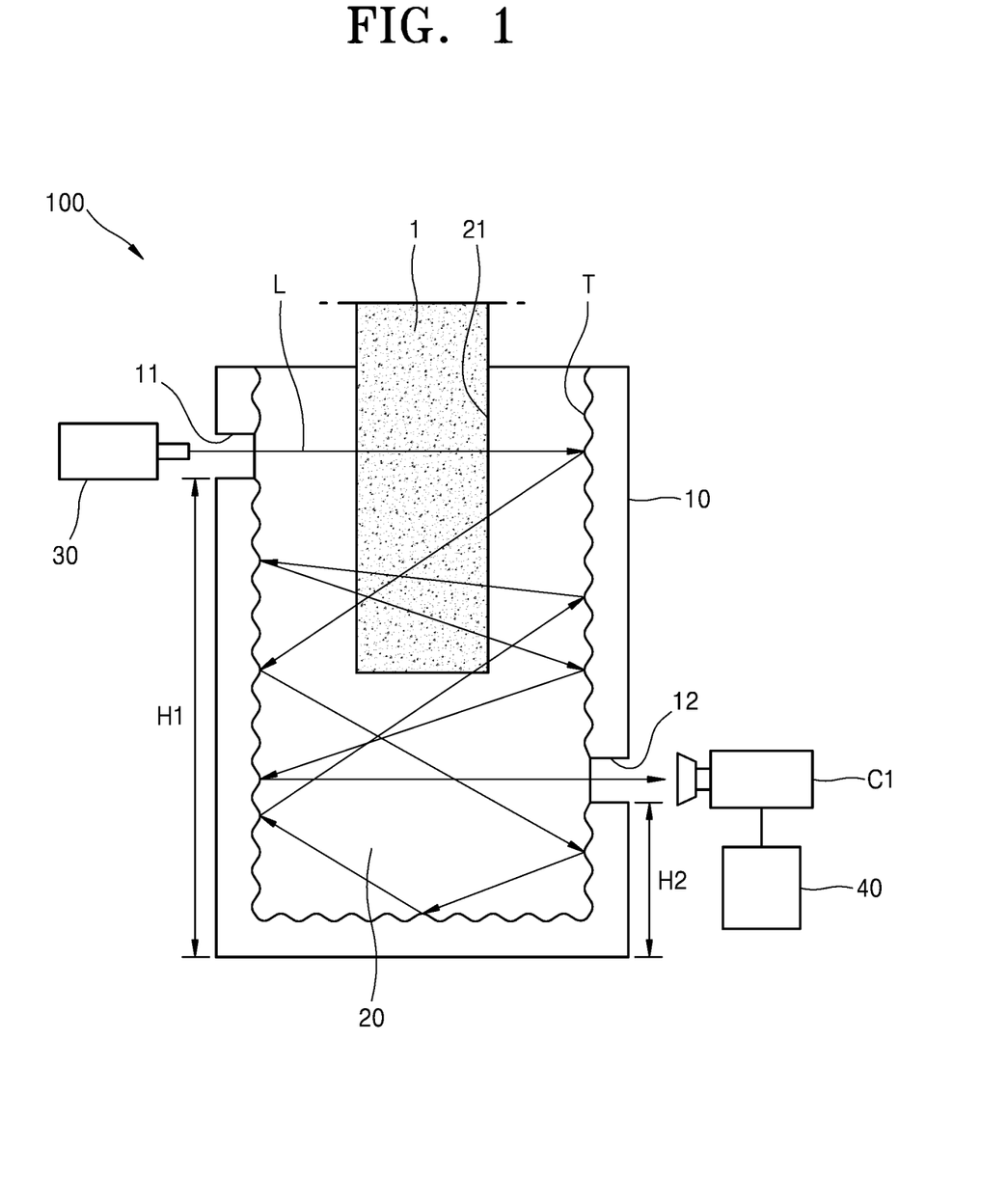
FIG. 1 is a side cross-sectional view conceptually illustrating an accurate turbidity measurement system using a speckle pattern according to some embodiments of the present invention.

FIG. 1 is a side cross-sectional view conceptually illustrating an accurate turbidity measurement system 100 using a speckle pattern according to some embodiments of the present invention.

First, as shown in FIG. 1, the accurate turbidity measurement system 100 using a speckle pattern according to some embodiments of the present invention may largely include a measuring container 10 and an optical dilution member 20.

For example, the measuring container 10 may be overall in the form of a hollow cylinder, polygonal cylinder, or pipe, and may be in the form of a multiple scattering waveguide having a light scattering space formed therein so as to enable multiple reflection or multiple scattering of laser light L through multiple paths.

In addition, for example, the measuring container 10 may have an overall cylindrical shape made of at least metal, glass, synthetic resin, and combinations thereof, in which scattering protrusions T or scattering layers are formed on the inner surface so that the multiple scattering phenomenon can sufficiently occur therein.

The measuring container 10 may have a light input part 11 formed in one side thereof so as to enable laser light L to be inputted, and have a light output part 12 formed in the other side thereof so as to enable measurement of micro-turbidity or bacterial or microbial contamination by using a speckle pattern generated in the light scattering space.

More specifically, for example, as shown in FIG. 1, in the measuring container 10, a first height H1 of the light input part 11 and a second height H2 of the light output part 12 may differ from each other such that a main light-emitting axis of a laser source 30 configured to generate the laser light L is deviated from a main light-receiving axis of a first camera C1 configured to measure the speckle pattern so as to block direct light and actively induce light scattering.

Although the drawing illustrates that the first height H1 is higher and the second height H2 is lower, the reverse is also possible, and various other types of heights may be applied.

Therefore, as shown in FIG. 1, when the laser light L is input through the light input part 11, sufficient multiple reflection and multiple scattering by the scattering protrusions T or the scattering layers occurs in the light scattering space and may be amplified as a variation over time according to minute movements due to internal foreign matter, bacteria, or microorganisms, that is, an overall speckle pattern, and the speckle pattern may be measured through the light output part 12.

On the other hand, for example, as shown in FIG. 1, the optical dilution member may have a sample 1 accommodation part 21 formed in at least a portion of the light scattering space and configured to accommodate a sample, which is an object to be measured, on one side, and may consist of an optical dilution medium that serves to optically dilute a speckle pattern of the sample 1 so as to allow a part of the laser light L to pass through the sample 1 and exhibit the speckle pattern, and allow another part of the laser light L to optically dilute the speckle pattern, enabling the measurement of micro-turbidity of the sample 1.

More specifically, for example, the optical dilution member 20 may be applied a pure light-transmission body, such as pure glass, pure crystal, pure ceramic, pure acrylic, etc., from which optical foreign matter or biological contamination is completely or almost eliminated, such that a speckle pattern is not produced therein.

The optical dilution member 20 may have an overall circular cylindrical shape in which at least a portion of the sample receiving part 21 is installed at a center axis of the measuring container 10, such that the optical dilution member 20 can be formed in a shape that sufficiently encompass the sample 1.

Therefore, for example, if 1 liter of the sample 1 with a turbidity of 40 is placed into a container containing 99 liters of the optical dilution member 20 with a turbidity of 1 and then irradiated with the laser light L, it would be optically equivalent to irradiating laser light to a 100-liter solution, which is a mixture of 1 liter of the sample 1 with a turbidity of 40 and 99 liters of the optical dilution member 20 with a turbidity of 1. In other words, the sample 1 with a turbidity of 41 may be diluted to a sample 1 with a turbidity of 0.41 divided by a total volume of 100 litters.

In the end, even for contaminated wash water with a turbidity of 40, using such an optical method may offer the same result of measuring a solution with a turbidity of 0.41 with the laser light L. Therefore, it is made possible to microscopically determine turbidity, such as determining turbidity as 0.4 for turbidity of 40, turbidity as 0.5 for turbidity of 50, and the like.

In addition, for example, as shown in FIG. 1, the accurate turbidity measurement system 100 using a speckle pattern according to some embodiments of the present invention may further include a laser source 30 configured to emit light the laser light L to the light input part 11, a first camera C1 configured to photograph a speckle pattern of the light output part 12, and a speckle pattern variation calculation part 40 configured to measure a variation over time of the speckle pattern using video information received from the first camera C1.

Here, the speckle pattern variation calculation part 40 may calculate a micro-turbidity value proportionally by multiplying an actually measured turbidity value obtained from the actually measured variation of the speckle pattern with a multiple of the area of the optical dilution member based on the area of the sample.

More specifically, for example, the speckle pattern variation calculation part 40 may use a non-contact speckle sensing method in which the laser light L is emitted to the sample 1 and a speckle pattern generated due to multiple scattering for the sample 1 is detected, and the principle of a chaotic wave sensor may be applied thereto.

For example, according to the principle of a chaotic wave sensor, in the case of a material with a homogeneous internal refractive index, such as glass, refraction occurs in a certain direction when coherent light is irradiated thereto.

However, when coherent light, such as laser light, is irradiated onto an object having a heterogeneous internal refractive index or formed of fine refraction or scattering protrusions, very complex multiple scattering occurs inside the material.

Some of the light rays that have been scattered through complicated paths due to multiple scattering pass through the sample 1, which is a test target object. Light rays passing through multiple points in the test target object generate constructive interference or destructive interference, and the constructive/destructive interference of the light rays generates grain patterns (speckles).

The light rays scattered along the complicated paths are referred to as "chaotic waves," and the chaotic waves may be detected through coherent light speckles, and in the case where the coherent light is laser light, the coherent light speckles may be detected through laser speckles.

When a stable medium is irradiated with coherent light, i.e., when a stable medium, in which an internal component does not move, is irradiated with coherent light (e.g., laser light), a stable speckle pattern without a variation may be observed.

However, when an unstable medium having an internal component that is moving, such as bacteria, is included therein, the speckle pattern changes.

That is, due to microscopic biological activities of microorganisms (e.g., intracellular movement, movement of microorganisms, etc.), an optical path may slightly change over time. Since the speckle pattern is generated by interference of light, a fine change in the optical path may cause variation in the speckle pattern. Accordingly, when a temporal variation in the speckle pattern is measured, the biological activities of microorganisms may be rapidly measured. As such, when the variation in the speckle pattern over time is measured, the presence or absence of microorganisms and concentration thereof may be identified, and furthermore, kinds of microorganisms may also be identified.

The test target object described in this specification is the sample 1 such as wash water or the like, and a configuration for measuring the variation in the speckle pattern of the sample 1 may be defined as a chaotic wave sensor. Here, the chaotic wave sensor may be configured in various types, such as a reflective type and a transmissive type, and an optical system may be configured in a packaging type.

In addition, the laser source 30 may use laser light L having good coherence as a light source. However, in addition to the laser light source, a light source having improved coherence by including a filter that passes only a wavelength of a specific band or specific wavelength in a general illumination source may be used. Alternatively, the measurement may be performed using a wavelength (e.g., infrared, ultraviolet, etc.) outside the visible light range.

Also, the first camera C1 that is a photographing device for photographing an image, and various image sensors may be applied thereto. When the sample 1 is irradiated with coherent light, a coherent light speckle may be formed by multiple scattering. If viruses, bacteria, microorganisms, etc. Are present in the sample 1, the presence and absence of bacteria and microorganisms and concentration thereof in the test target object may be rapidly determined based on a pattern of the coherent light speckles that vary over time.

For example, as the test target object is irradiated with coherent light every reference time at regular intervals, a coherent light speckle may be formed in the test target object, and as the test target object in which multiple scattering occurs is photographed using the camera or the like, a coherent light speckle image of the formed coherent light speckle may be generated. In this case, a camera including a two-dimensional image sensor or a one-dimensional optical sensor may be used to measure a speckle pattern of a plurality of generated images. For example, a camera equipped with an imaging device, such as a charge-coupled device (CCD) may be used as a measurement unit.

Therefore, whether bacteria and microorganisms are present in the sample 1 may be determined from the photographed coherent light speckle images in a non-contact manner by checking whether the coherent light speckles are changed in pattern over time. For example, if there is no activity in the sample 1, coherent light speckles appear with a constant interference pattern over time. That is, if there is no activity, a constant interference pattern of the coherent light speckles may be found in the images of the coherent light speckles measured every reference time. As such, when the coherent light speckle images show no, or very little, variation of the interference pattern over time, it may be determined that bacteria and microorganisms are absent in the sample 1.

On the other hand, when the pattern of the coherent light speckles changes, it may be determined that bacteria and microorganisms are present in the sample 1. That is, when bacteria and microorganisms are present in the sample 1, the bacteria and microorganisms may multiply over time, and the bacteria and microorganisms may continuously move. This movement of the bacteria or microorganisms may cause the continuous change of the pattern of laser speckles over time. Accordingly, when the pattern of the coherent light speckles has changed by a degree greater than or equal to a predetermined error range in the coherent light speckle images measured every reference time, it may be determined that bacteria and microorganisms are present in the sample 1.

In this case, the degree of change in the pattern of the coherent light speckles may be determined according to the concentration of bacteria and microorganisms. Accordingly, the concentration of the bacteria and microorganisms may be measured through temporal correlation analysis. For example, a standard deviation of light intensity of coherent light speckles may be used to measure the degree of change in the pattern of the coherent light speckles.

Therefore, when the laser light L generated by the laser source 30 is input through the light input part 11, sufficient multiple reflection and multiple scattering by the scattering protrusions T or the scattering layers occurs in the light scattering space and may be amplified as a variation over time according to minute movements due to internal foreign matter, bacteria, or microorganisms, that is, an overall speckle pattern.

At this time, using the optical dilution member 20 may allow a part of the laser light L to pass through the sample 1 and exhibit a speckle pattern and allow another part of the laser light L to optically dilute the speckle pattern of the sample 1, and then the speckle pattern may be output through the light output part 12, which may be photographed by the first camera C1 in the form of a time-lapse video, and the speckle pattern variation calculation part 40 may measure a variation over time of the speckle pattern to calculate more accurate micro-turbidity or bacterial or microbial contamination.

Here, micro-turbidity and biological contamination may be measured in a non-flowing state of the sample 1, but are not necessarily limited thereto, such that the micro-turbidity and biological contamination may be measured even in a flowing state.

In addition, here, the "micro-turbidity" does not imply a narrow total measurement range between the upper and lower limits of the measurement. That is, the micro-turbidity refers to a measurement method that has a very wide measurement range, yet is capable of precisely measuring turbidity at very low levels, such as at levels of several tens, several units, or even at decimal levels of units.

Therefore, whereas the conventional turbidity measurement method using an optical sensor only measures and distinguishes macro-turbidity, such as 10, 1000, etc., the present invention allows for the turbidity of the sample 1, such as wash water of a washing machine, to be precisely measured and distinguished as a micro-level such as 41, 43, 43, or 44, by using the optical dilution member 20 capable of optically diluting the optical concentration of the sample 1, while overcoming the limitation of the speckle detection device that fails to detect turbidity due to saturation of sensing capability thereof even if the turbidity exceeds about 20. As a result, it is possible to accurately stop washing at a turbidity of 45, which is the optimal turbidity of wash water, thereby saving wash water of washing machines or significantly improving the performance of the washing machines. Also, biological contamination of the sample caused by bacteria or microorganisms may be measured, greatly enhancing the performance, precision, and reliability of washing machines and other electronic products that require turbidity measurement.

Figure 2:
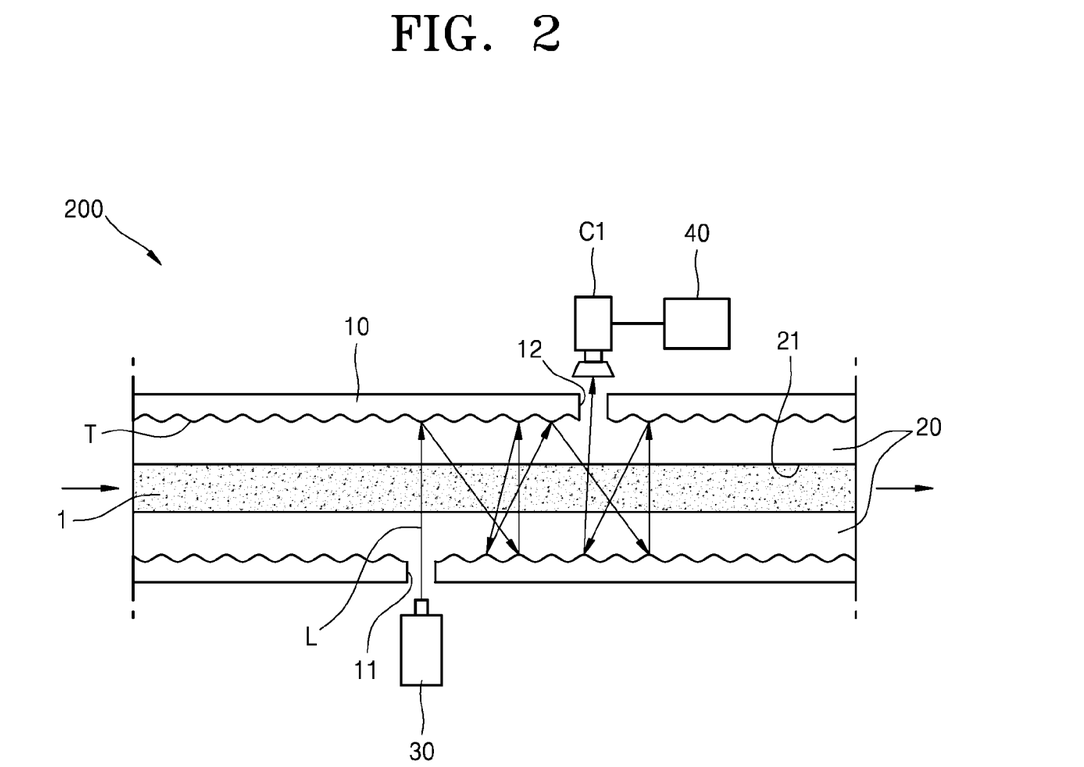
FIG. 2 is a side cross-sectional view conceptually illustrating an accurate turbidity measurement system using a speckle pattern according to some other embodiments of the present invention.

FIG. 2 is a side cross-sectional view conceptually illustrating an accurate turbidity measurement system 200 using a speckle pattern according to some other embodiments of the present invention.

As shown in FIG. 2, in the accurate turbidity measurement system 200 using a speckle pattern according to some other embodiments of the present invention, the measuring container 10 may be formed in the shape of an external pipe, and the optical dilution member 20 may be formed in the shape of an inner pipe, such that a micro-turbidity and biological contamination of the sample 1 can be measured even while the sample 1 is flowing.

Figure 3:
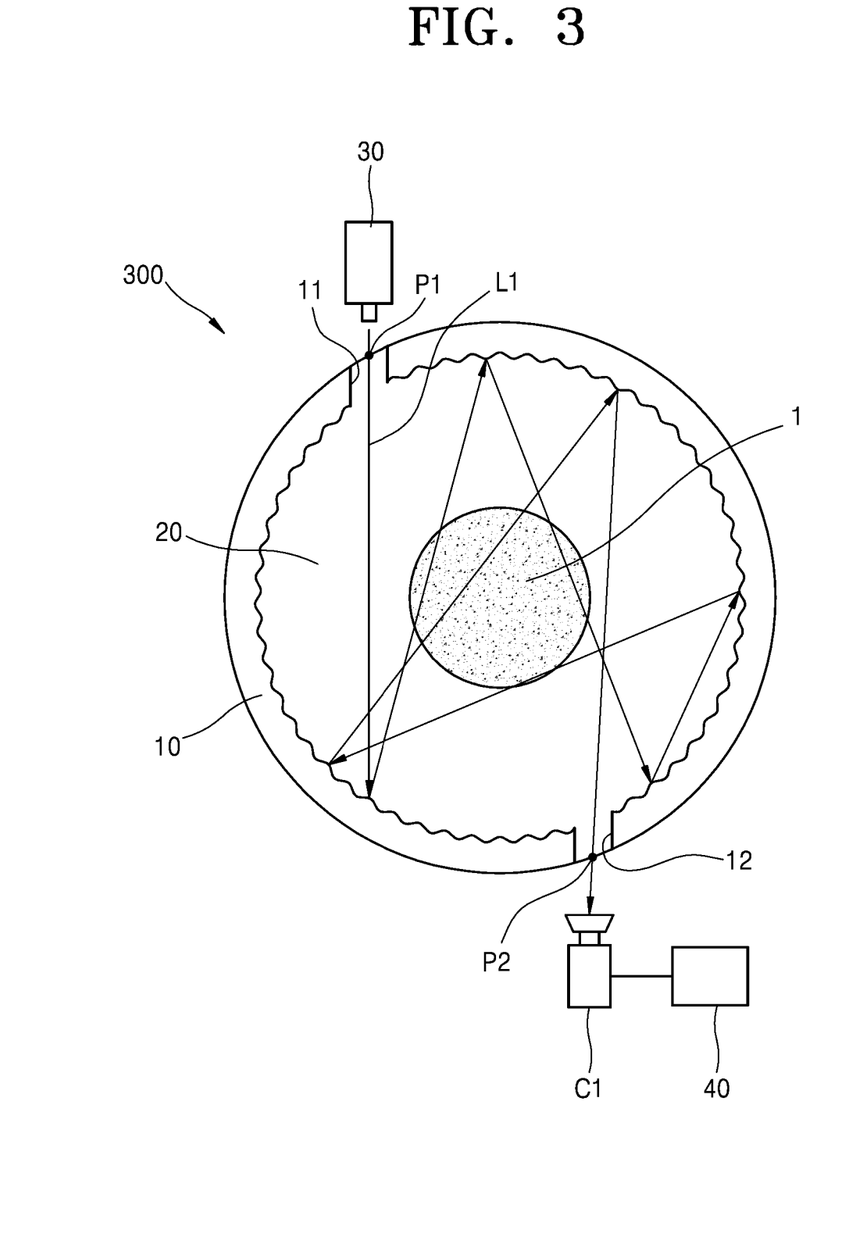
FIG. 3 is a plan cross-sectional view conceptually illustrating an accurate turbidity measurement system using a speckle pattern according to some other embodiments of the present invention.

FIG. 3 is a plan cross-sectional view conceptually illustrating an accurate turbidity measurement system 300 using a speckle pattern according to some other embodiments of the present invention.

As shown in FIG. 3, the accurate turbidity measurement system 300 using a speckle pattern according to some other embodiments of the present invention, when viewed in a plan view, a first eccentric position P1 of the light input part 11 and a second eccentric position P2 of the light output part 12 may differ from each other so as to block direct light and actively induce light scattering.

Therefore, as shown in FIG. 3, using the optical dilution member 20 may allow a part of the laser light L to pass through the sample 1 and show a speckle pattern and may allow another part of the laser light L to optically dilute the speckle pattern of the sample 1, which may be then output through the light output part 12.

Figure 4:
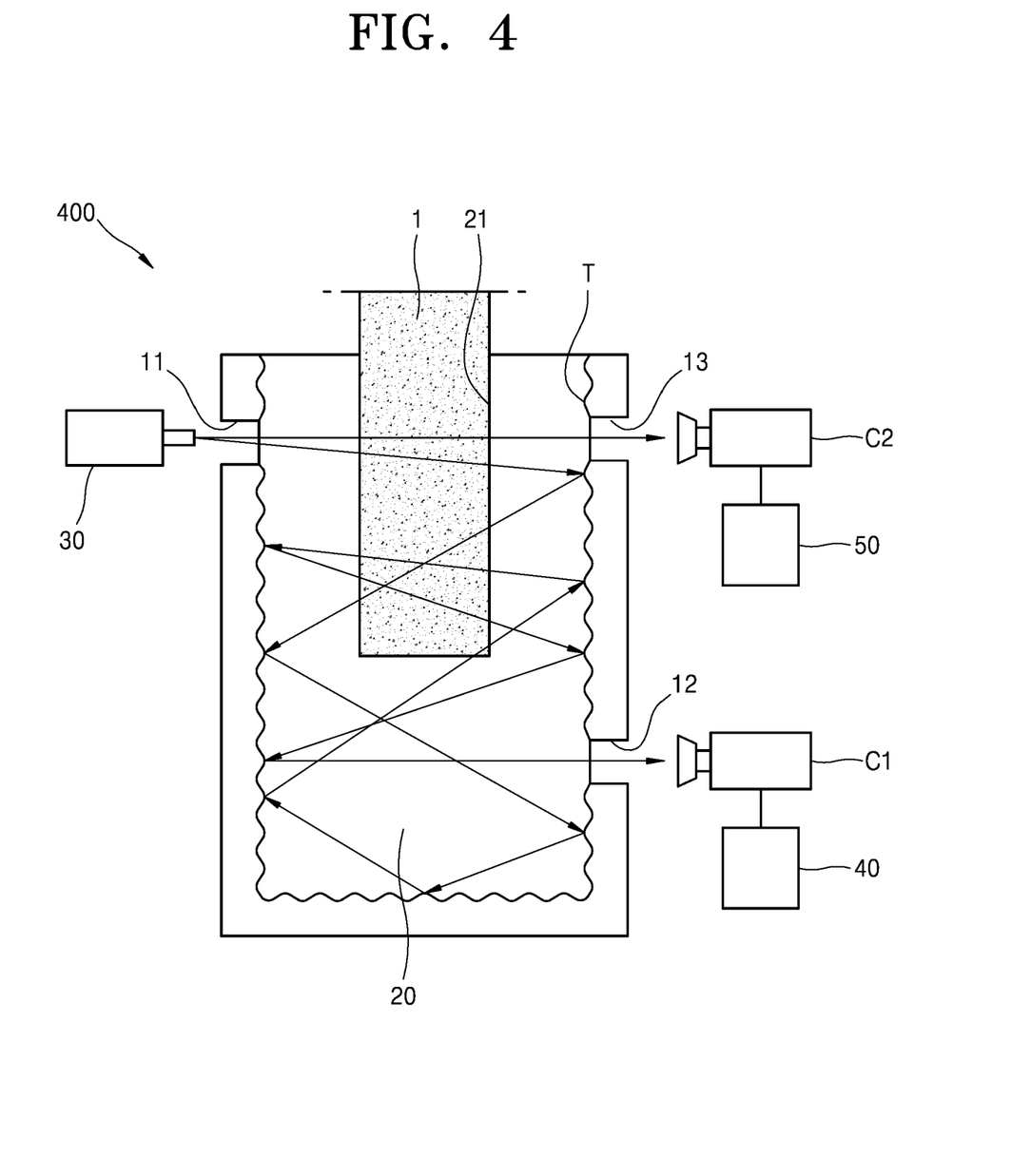
FIG. 4 is a side cross-sectional view conceptually illustrating an accurate turbidity measurement system using a speckle pattern according to some other embodiments of the present invention.

FIG. 4 is a side cross-sectional view conceptually illustrating an accurate turbidity measurement system 400 using a speckle pattern according to some other embodiments of the present invention.

As shown in FIG. 4, a measuring container 10 of the accurate turbidity measurement system 400 using a speckle pattern according to some other embodiments of the present invention may have an optical hole 13 formed at a portion that corresponds to the main light-emitting axis line of the laser source 30 passing through the sample 1.

In addition, the accurate turbidity measurement system 400 using a speckle pattern according to some other embodiments of the present invention may include a second camera C2 configured to photograph the brightness of the optical hole 13 and a macro-turbidity calculation part 50 configured to calculate a macro-turbidity using brightness information received from the second camera C2.

Therefore, the first camera C1 may photograph the speckle pattern output through the light output part 12 in the form of a time-lapse video, and the speckle pattern variation calculation part 40 may measure a variation over time of the speckle pattern to calculate more precise micro-turbidity or bacterial or microbial contamination. At the same time, the second camera C2 may photograph the optical brightness output through the optical hole 13 in the form of an instantaneous still image, and the macro-turbidity calculation part 50 may calculate the macro-turbidity.

Therefore, according to the present invention, it is possible to simultaneously measure macro-turbidity and micro-turbidity, and to mutually verify or complementarily use the measured values.

Here, the first camera C1 may be a camera capable of recording a video to measure a variation over time of a speckle pattern, and the second camera C2 may be a type of photosensor capable of measuring optical brightness, i.e., intensity of light.

Figure 5:
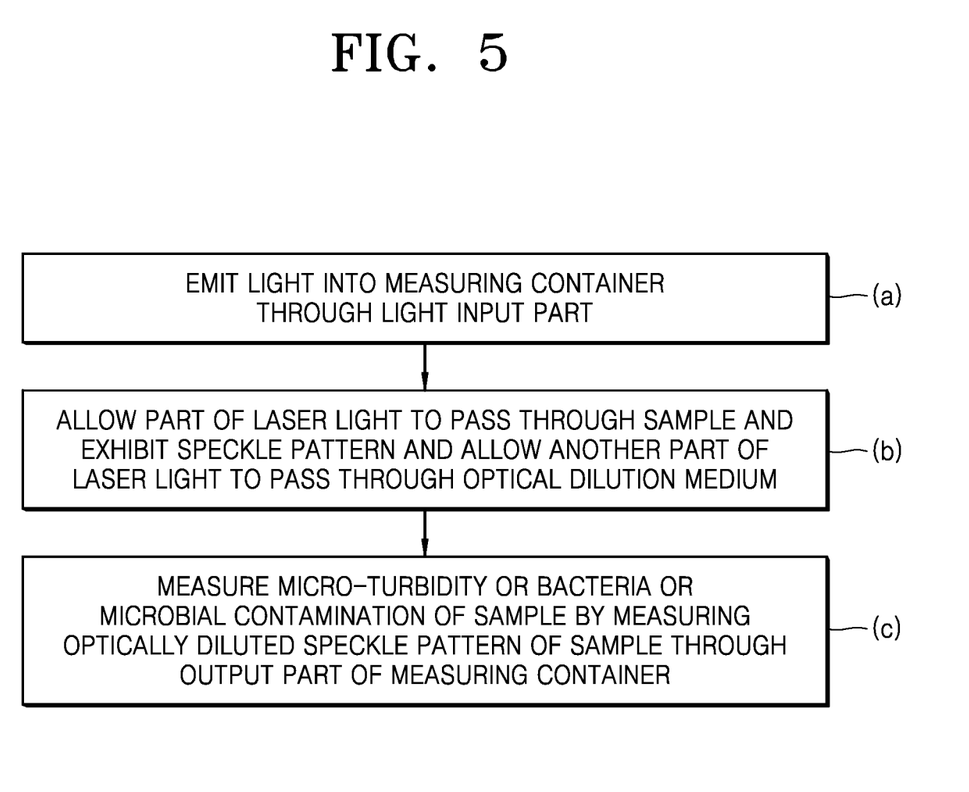
FIG. 5 is a flowchart illustrating an accurate turbidity measurement method using a speckle pattern according to some embodiments of the present invention.

FIG. 5 is a flowchart illustrating an accurate turbidity measurement method using a speckle pattern according to some embodiments of the present invention.

As shown in FIGS. 1 to 5, an accurate turbidity measurement method using a speckle pattern according to some embodiments may include: (a) emitting the laser light L into the measuring container 10 through the light input part 11; (b) enabling multiple reflection or multiple scattering of the laser light L through multiple paths using a light scattering space of the measuring container 10 such that a part of the laser light L passes through the sample 1 and exhibits a speckle pattern and another part of the laser light L passes through an optical dilution medium that optically dilutes the speckle pattern of the sample 1; and (c) measuring micro-turbidity or bacterial or microbial contamination of the sample 1 by measuring the optically diluted speckle pattern of the sample 1 through the light output part 12 of the measuring container 10.

Here, in operation (c), a micro-turbidity value may be calculated proportionally by multiplying an actually measured turbidity value obtained from an actually measured variation of the speckle pattern with a multiple of the area of the optical dilution member based on the area of the sample.

Figure 6:
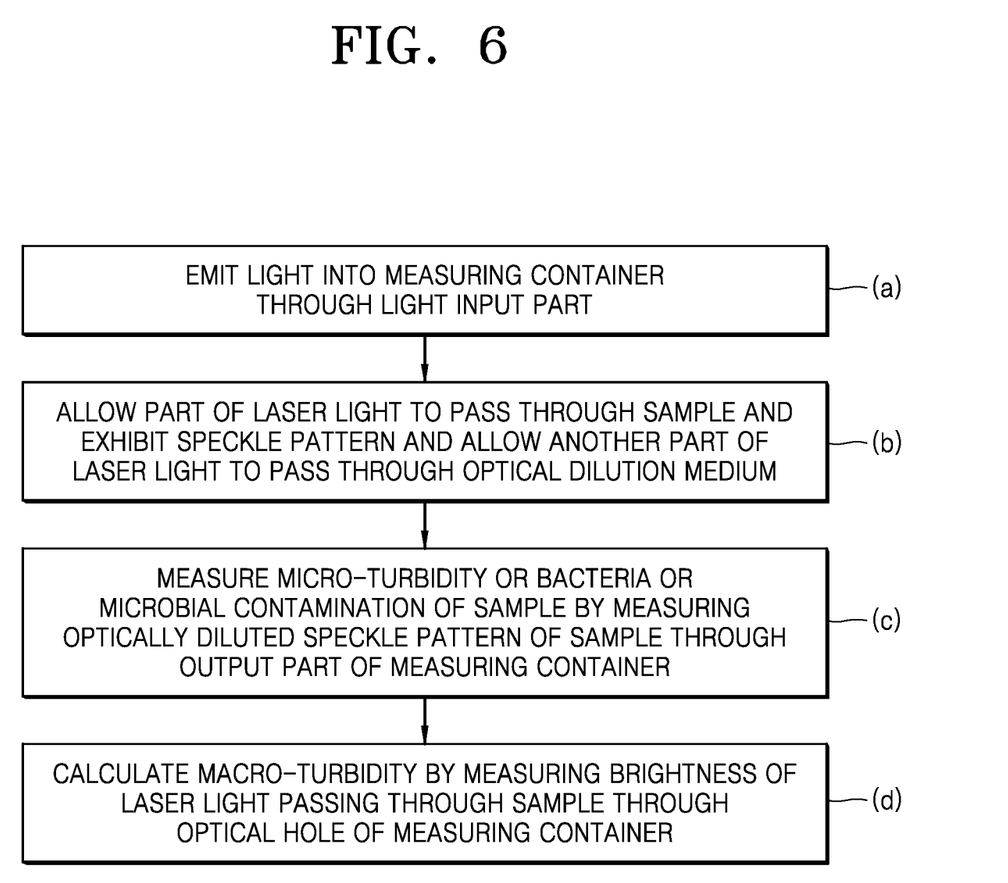
FIG. 6 is a flowchart illustrating an accurate turbidity measurement method using a speckle pattern according to some other embodiments of the present invention.

FIG. 6 is a flowchart illustrating an accurate turbidity measurement method using a speckle pattern according to some other embodiments of the present invention.

As shown in FIGS. 1 to 6, an accurate turbidity measurement method using a speckle pattern according to some embodiments may include: (a) emitting the laser light L into the measuring container 10 through the light input part 11; (b) enabling multiple reflection or multiple scattering of the laser light L through multiple paths using a light scattering space of the measuring container 10 such that a part of the laser light L passes through the sample 1 and exhibits a speckle pattern and another part of the laser light L passes through an optical dilution medium that optically dilutes the speckle pattern of the sample 1; (c) measuring micro-turbidity or bacterial or microbial contamination of the sample 1 by measuring the optically diluted speckle pattern of the sample 1 through the light output part 12 of the measuring container 10; and after (b) (d) calculating macro-turbidity by measuring brightness of the laser light L that has passed through the sample 1 through the optical path 13 of the measuring container 10.

Although the present invention has been described in connection with the exemplary embodiment shown in the drawings, it is only illustrative. It will be understood to those skilled in the art that various modifications and equivalents can be made without departing from the scope and spirit of the invention. Therefore, the scope of the present invention should be defined only by the appended claims.

The invention claimed is:

1. An accurate turbidity measurement system using a speckle pattern, the system comprising:
    a measuring container which has a light input part disposed in one side thereof and configured to enable laser light to be inputted, has a light scattering space defined therein and configured to enable multiple reflection or multiple scattering of the laser light through multiple paths, and has a light output part disposed in an other side thereof and configured to enable a measurement of micro-turbidity by using the speckle pattern generated in the light scattering space;
    an optical dilution member which is disposed in at least a portion of the light scattering space, has a sample receiving part disposed in one side thereof and configured to receive a sample being measured, and comprises an optical dilution medium configured to dilute the speckle pattern of the sample and enable the measurement of the micro-turbidity of the sample;
    a laser source configured to emit the laser light to the light input part;
    a first camera configured to photograph the speckle pattern of the light output part; and
    a speckle pattern variation calculation part configured to measure a variation over time of the speckle pattern using video information received from the first camera,
    wherein the speckle pattern variation calculation part is configured to calculate a micro-turbidity value proportionally by multiplying a measured turbidity value obtained from the variation of the speckle pattern with a multiple of an area of the optical dilution member based on an area of the sample.

2. The system of claim 1, wherein the measuring container has an overall cylindrical shape made of at least metal, glass, synthetic resin, and combinations thereof, in which scattering protrusions or scattering layers are defined on an inner surface.

3. The system of claim 1, wherein, in the measuring container, a first height of the light input part and a second height of the light output part differ from each other, and a main light-emitting axis of the laser source configured to generate the laser light is deviated from a main light-receiving axis of the first camera configured to measure the speckle pattern, or a first eccentric position of the light input part and a second eccentric position of the light output part differ from each other.

4. The system of claim 1, wherein the optical dilution member is a pure light transmission body from which optical foreign matter or biological contamination is completely eliminated, and the speckle pattern is not produced therein.

5. The system of claim 4, wherein the optical dilution member has an overall circular cylindrical shape in which at least a portion of the sample receiving part is disposed at a center axis of the measuring container, and the optical dilution member is configured to encompass the sample.

6. The system of claim 1, wherein the measuring container has an optical hole defined at a portion that corresponds to a main light-emitting axis line of the laser source passing through the sample, and wherein the system further comprises:
- a second camera configured to photograph brightness of the optical hole; and
- a macro-turbidity calculation part configured to calculate macro-turbidity using a brightness information received from the second camera.

7. An accurate turbidity measurement method using a speckle pattern, the method comprising:
- emitting laser light into a measuring container through a light input part;
- enabling multiple reflection or multiple scattering of the laser light through multiple paths using a light scattering space of the measuring container, wherein a part of the laser light passes through a sample and exhibits the speckle pattern, and another part of the laser light passes through an optical dilution medium that optically dilutes the speckle pattern of the sample; and
- measuring micro-turbidity of the sample by measuring the optically diluted speckle pattern of the sample through a light output part of the measuring container,
- wherein, in the measuring the micro-turbidity, the micro-turbidity is calculated proportionally by multiplying a turbidity value obtained from a measured variation of the speckle pattern with a multiple of an area of the optical dilution medium based on an area of the sample.

8. The method of claim 7, further comprising: after the enabling multiple reflection or multiple scattering of the laser light, calculating macro-turbidity by measuring brightness of the laser light that has passed through the sample through an optical path of the measuring container.

* * * * *